(12) United States Patent
Campbell et al.

(10) Patent No.: US 10,277,989 B2
(45) Date of Patent: Apr. 30, 2019

(54) OPTO-ACOUSTIC TRANSDUCER AND COVER GLASS

(71) Applicant: GoPro, Inc., San Mateo, CA (US)

(72) Inventors: Scott Patrick Campbell, Belmont, CA (US); Leo Baldwin, Seattle, WA (US); Gary Fong, Cupertino, CA (US)

(73) Assignee: GoPro, Inc., San Mateo, CA (US)

( * ) Notice: Subject to any disclaimer, the term of this patent is extended or adjusted under 35 U.S.C. 154(b) by 180 days.

(21) Appl. No.: 15/356,375

(22) Filed: Nov. 18, 2016

(65) Prior Publication Data

US 2018/0146303 A1     May 24, 2018

(51) Int. Cl.
*G01H 9/00*     (2006.01)
*H04R 23/00*     (2006.01)

(52) U.S. Cl.
CPC .............. *H04R 23/008* (2013.01); *G01H 9/00* (2013.01)

(58) Field of Classification Search
CPC .............................. G01H 9/00; H04R 23/008
See application file for complete search history.

(56) References Cited

U.S. PATENT DOCUMENTS

| 4,636,076 A * | 1/1987 | Pettigrew ................. G01D 5/38 356/499 |
| 2004/0130728 A1* | 7/2004 | Degertekin .......... G01B 11/026 356/505 |
| 2015/0145084 A1* | 5/2015 | Chang ............... H01L 27/14621 257/432 |

* cited by examiner

*Primary Examiner* — Shi K Li
(74) *Attorney, Agent, or Firm* — Young Basile Hanlon & MacFarlane, P.C.

(57) ABSTRACT

An opto-acoustic transducer may include a light source, a substrate, a top layer, an interstitial layer, a lens, and a detector array. The light source may generate light beams. The substrate may reflect the light beams generated by the light source. The top layer may modulate responsive to an acoustical wave impingent thereupon and may reflect the light beams generated by the light source. The interstitial layer may be between the substrate and the top layer and may include a cavity which acts as an optical collector. The lens may propagate the light beams reflected by the substrate and the light beams reflected by the top layer. The detector array may reconstruct the acoustical wave impingent on the top layer based on the light beams propagated by the lens.

14 Claims, 5 Drawing Sheets

OPTO-ACOUSTIC TRANSDUCER AND COVER GLASS

TECHNICAL FIELD

The disclosure generally relates to the field of transducers, for example opto-acoustic transducers.

BACKGROUND

A conventional acoustic transducer converts sound into an electrical signal. These transducers produce the electrical signal from air pressure variations by using various techniques such as electromagnetic induction, capacitance change, or piezoelectricity. The components required to implement such techniques can increase the cost of the acoustic transducer.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to embodiments by way of illustration only. It should be noted that from the following discussion, alternative embodiments of the structure and methods disclosed herein will be readily recognized as viable alternatives that may be employed without departing from the principles of what is claimed.

Reference will now be made in detail to several example embodiments, examples of which are illustrated in the accompanying figures. It is noted that whenever practicable, similar or like reference numbers may be used in the figures and may indicate similar or like functionality. The figures depict example embodiments of the disclosed system (or method) for purposes of illustration only. One skilled in the art will readily recognize from the following description that alternative embodiments of the structures and methods illustrated herein may be employed without departing from the principles described herein.

Configuration Overview

An acoustic transducer converts sound into an electrical signal. An opto-acoustic transducer, a specific type of acoustic transducer, converts sound into an electrical signal based on changes in light. The opto-acoustic transducer may include a light source, a substrate, a top layer, an interstitial layer, a lens, and a detector array. The light source may generate light beams. The substrate may reflect the light beams generated by the light source. The top layer may modulate responsive to an acoustical wave impingent thereupon and may reflect the light beams generated by the light source. The interstitial layer may be between the substrate and the top layer and may include a cavity which acts as an optical collector. The lens may propagate the light beams reflected by the substrate and the light beams reflected by the top layer. The detector array may reconstruct the acoustical wave impingent on the top layer based on the light beams propagated by the lens.

An example advantage of the acoustic transducers described herein is that they can be more sensitive than conventional acoustic transducers. The acoustic transducers described herein measure movements of an acoustic surface on the order of a fraction of a wavelength. Another advantage of the acoustic transducers described herein is that they are not magnetic and not piezoelectric based, and therefore operate as desired even in environments with strong electromagnetic fields. Yet another advantage of the acoustic transducers described herein is that they allow for remote acoustic sensing. In other words, the acoustic transducers can be away from a direction (or direct line) of an acoustical wave and can still detect the acoustical wave.

Opto-Acoustic Transducer

Figure 1:
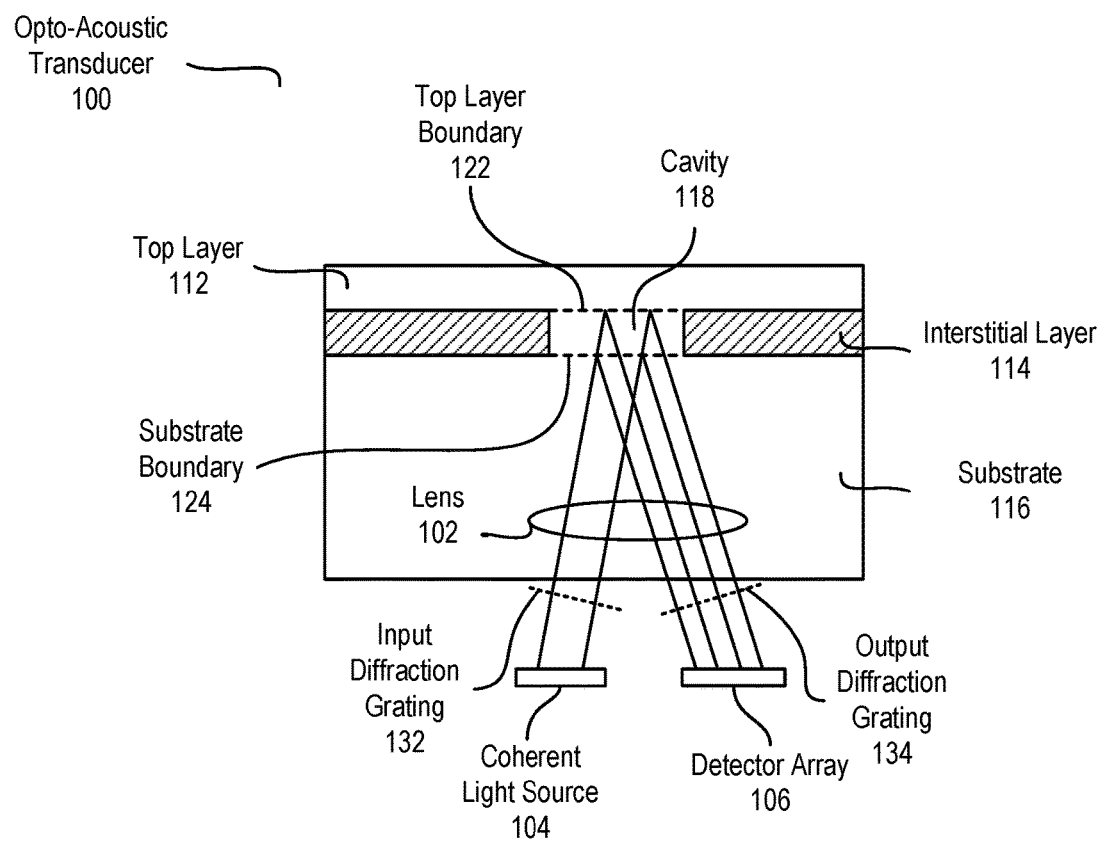
FIG. 1 illustrates an opto-acoustic transducer, according to one example embodiment.

Figure (FIG. 1 illustrates an opto-acoustic transducer 100 (referenced as transducer 100), according to one example embodiment. The transducer 100 may measure (or otherwise quantify) an acoustical wave impingent thereupon. For example, the transducer 100 may determine amplitude, frequency, and phase information of the acoustical wave. The transducer 100 may reconstruct the acoustical wave based on the determined amplitude, frequency, and phase information. The transducer 100 includes a lens 102, a top layer 112, an interstitial layer 114, a substrate 116, a coherent light source 104, and a detector array 106.

The lens 102 propagates light beams from the coherent source 104 to the detector array 106. In some configurations, the lens 102 propagates light beams from an input diffraction grating 132 to an output diffraction grating 134. The lens 102 transforms angles at a substrate boundary 124 and at a top layer boundary 122 to positions at the input diffraction grating 132 and the output diffraction grating 134, respectively. The lens 102 may be a multi-layer cover-glass which may be transparent to visible light and which may be reflective to ultraviolet (UV) light and/or infrared (IR) light. Although the lens 102 is illustrated as a single lens, in some configurations, the lens 102 may be two lenses, a first lens corresponding to the coherent light source 104 (or the input diffraction grating 132) and a second lens corresponding to the detector array 106 (or the output diffraction grating 134). In some configurations, there may be a single lens corresponding to the detector array 106 (or the output diffraction grating 134). In these configurations, the single lens propagates light beams generated by the coherent light source 104 and reflected by the substrate 116 (e.g., at the substrate boundary 124) and by the top layer 112 (e.g., at the top layer boundary 122).

The top layer 112 is an acoustic surface that is modulated due to an acoustical wave impingent thereupon. The top layer 112 may be a cover glass with sufficient give and may be on the order of 1 millimeter or less. The top layer 112 may include the top layer boundary 122 between a bottom of the top layer 112 and a top of the interstitial layer 114. The top layer boundary 122 may include a pattern etched thereupon.

The top layer 112 and/or the top layer boundary 122 may be such that they reflect one or more light beams output by the coherent light source 104.

The interstitial layer 114 separates the top layer 112 and the substrate 116. The interstitial layer 114 may be a plate and may act as a dampener. The interstitial layer 114 may include a cavity 118. The cavity 118 allows the top layer 112 to move relative to the substrate 116 and allows for two different reflections of one or more light beams output by the coherent light source 104 which creates an interference fringe pattern at the detector array 106. The cavity 118 is structured to act as an optical collector. The cavity 118 may be filled or unfilled. A filled cavity 118 may be filled with air and may include a grating for greater differentiation of the light beams reflected off the top layer boundary 122. An unfilled cavity 118 may be a vacuum.

Figure 2:
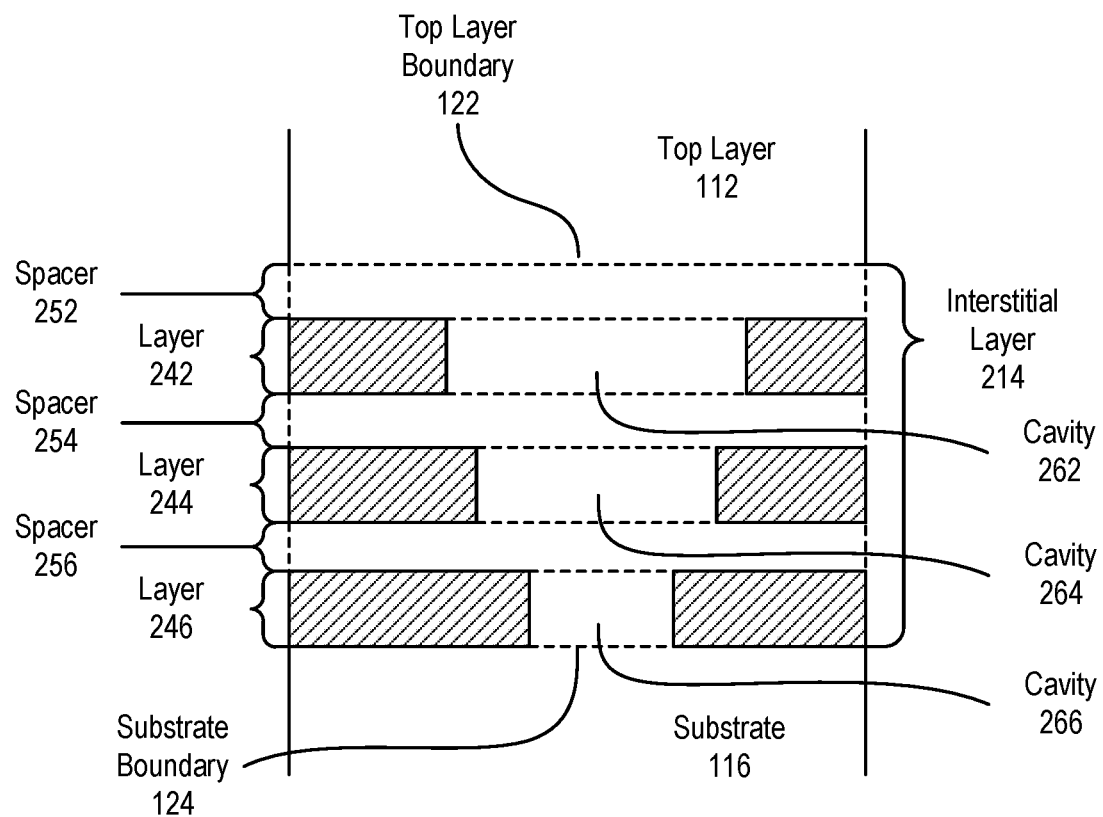
FIG. 2 illustrates an interstitial layer, according to one example embodiment.

Referring briefly to FIG. 2, it illustrates an interstitial layer 214, according to one example embodiment. The interstitial layer 214 may include layers 242, 244, and 246 and spacers 252, 254, and 256. The layers 242, 244, and 246 may include cavities 262, 264, and 266, respectively. Each of the cavities 262, 264, and 266 may be of varying area. For example, the cavity 262 may have a larger area than the cavity 264 which may have a larger area than the cavity 266. Each of the layers 242, 244, and 246 may be similar to the interstitial layer 114 of FIG. 1. Each of the spacers 252, 254, and 256 may be of varying thickness. For example, the spacer 252 may be thicker than the spacer 254 which may be thicker than the spacer 256. In some configurations, the interstitial layer 214 may not include spacer 252. In these configurations, the layer 242 may be at a top of the interstitial layer 214. Each of the spacers 252, 254, and 256 may be made of material with varying compliance. Compliance may be a measure of strain versus stress. For example, the spacer 256 may be made with material that is more compliant than that of spacer 254 which may be more compliant than that of spacer 252. Implementing an interstitial layer including multiple spacers and multiple layers, each including a cavity, may improve a dynamic range, gain, frequency response, and/or sensitivity than compared to an interstitial layer including a single layer including a cavity.

Referring back to FIG. 1, the substrate 116 allows for reflections of one or more light beams output from the coherent light source 104. For example, the substrate 116 allows for first reflections at the substrate boundary 124 and second reflections at the top layer boundary 122. The substrate 116 may include a pattern etched at a bottom of the substrate 116. The substrate 116 may include the substrate boundary 124 between a top of the substrate 116 and a bottom of the interstitial layer 114. The substrate boundary 124 may include a pattern etched thereupon. The substrate 116 and/or the substrate boundary 124 may be such that they reflect one or more light beams output from the coherent light source 104.

The lens 102 may include an optional input diffraction grating 132 and an optional output diffraction grating 134. The input diffracting grating 132 and the output diffraction grating 134 each include an optical structure and an analyzer. The analyzer measures modulation of light reflected upon it or the amount of motion between the top layer 112 and the substrate 116 which cause reflected light to be modulated. The analyzer may use a VRNIR scale to measure the modulation/the amount of motion. The input diffraction grating 132 may be between the coherent light source 104 and a bottom of the substrate 116, at the bottom of the substrate 116, inside the substrate 116, or at the substrate boundary 124. The output diffraction grating 134 may act as a filter and may improve a signal to noise ratio. The output diffraction grating 134 may be inside the substrate 116, at the bottom of the substrate 116, or between the substrate 116 and the detector array 106. The output diffraction grating 134 may be a Talbot length, or multiple thereof, from the top layer boundary 122 when there is no acoustical wave impingent on the top layer 112. In some configurations, if the lens 102 includes the input diffraction grating 132, the lens 102 may not include the output diffraction grating 134, and vice versa.

The coherent light source 104 may generate and output one or more light beams. The one or more light beams may be UV light and/or IR light. Each of the light beams may have a same frequency and may be phase-linked. The light beams may be modulated or unmodulated. The modulated light beams may include modulations in amplitude, frequency, phase, and/or polarization. The coherent light source 104 (or the transducer 100) may include a collimator (not shown) for producing parallel light beams.

The detector array 106 may reconstruct the acoustical wave impingent on the top layer 112 based on the light beams propagated by the lens 102. The detector array 106 may measure (or otherwise quantify) an interference fringe pattern incident thereupon. A position of the detector array 106 relative to the bottom of the substrate 116 may be fixed. The detector array 106 may be a Talbot length, or multiple thereof, from the top layer boundary 122 when there is no acoustical wave impingent on the top layer 112. The detector array 106 may be orthogonal to the bottom of the substrate 116 or may be tilted with respect to the bottom of the substrate 116. The detector array 106 is described in further detail with reference to FIGS. 3A and 3B.

In some example embodiments, the transducer 100 may be embedded or otherwise included in a ruggedized device. The ruggedized device should not include compliant material that is exposed to the outside world. In these example embodiments, the transducer 100 included in the ruggedized device may not include a substrate (e.g., the substrate 116).

Example Detector Array

The detector array 106 may measure an interference fringe pattern incident thereupon. The interference fringe pattern may be caused by interference between light beams reflected off the top layer boundary 122 and the substrate boundary 124 (collective referenced to as boundaries 122 and 124). The light beams reflected off the boundaries 122 and 124 may interfere inside the substrate 116, between the substrate 116 and the output diffraction grating 134, or between the substrate 116 and the detector array 106. The interference fringe pattern may depend on a path length between the top layer boundary 122 and the detector array 106 and/or between the substrate boundary 124 and detector array 106. The interference fringe pattern may be longitudinal.

In some configurations, the interference fringe pattern may be a Moire pattern. The Moire pattern may be created when the light beams reflected off the boundaries 122 and 124 are superimposed (i.e., overlaid) while displaced or rotated some amount from one another.

The detector array 106 may include one or more detectors. Each detector of the detector array 106 may measure a part of the interference fringe pattern incident thereupon. In some configurations, the measuring of the part of the interference fringe pattern by each detector may be a binary process. In other words, each detector may either measure or not measure the part of the interference fringe pattern. A size of each detector 106 may be smaller than a bright region (or dark region) of the interference fringe pattern. A detector may output a voltage representative of a measure of the part of the interference fringe pattern incident thereupon. A sum of the voltages output of each detector of the detector array 106 may represent a measure of the interference fringe pattern incident upon the entire detector array 106. Implementing the detector array 106 as one or more detectors may improve a signal to noise ratio.

Figure 3A:
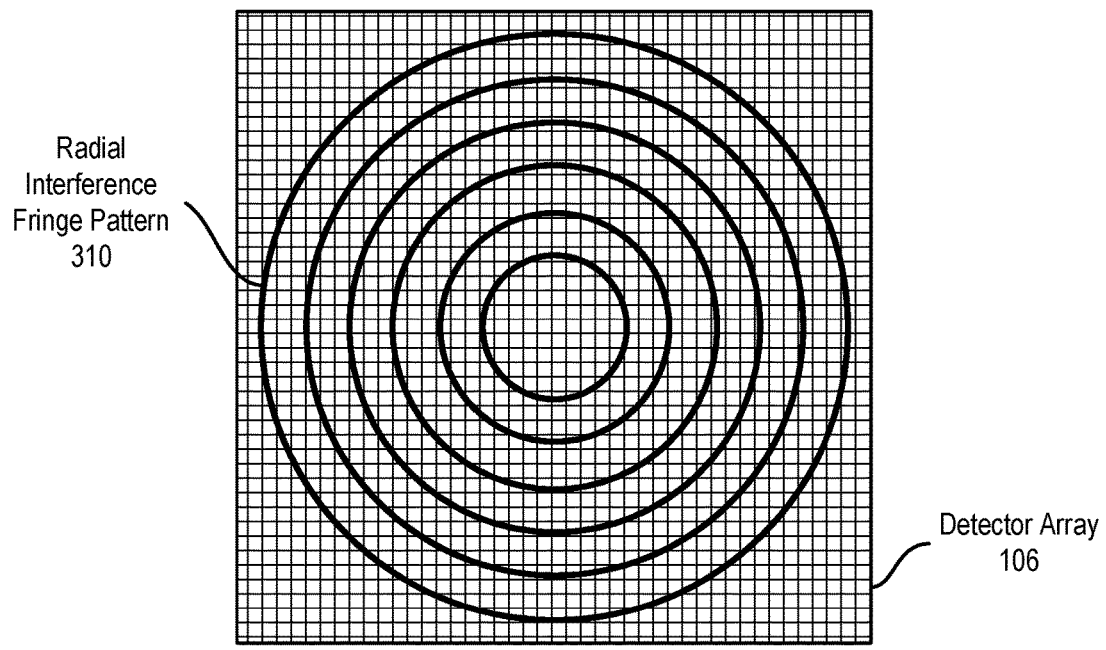
FIG. 3A illustrates a detector array having a radial interference fringe pattern incident thereupon, according to one example embodiment.
Figure 3B:
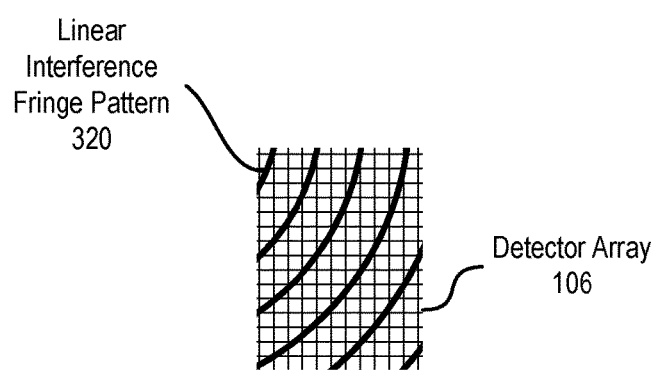
FIG. 3B illustrates a detector array having a substantially linear interference fringe pattern incident thereupon, according to one example embodiment.

The interference fringe pattern at the detector array 106 may be radial or substantially linear. FIG. 3A illustrates a radial interference fringe pattern 310 and FIG. 3B illustrates a substantially linear interference fringe pattern 320. For example, the interference fringe pattern at the detector array 106 may be radial if the detector array 106 is greater than a threshold size and may be substantially linear otherwise. The threshold size of the detector array 106 may be related to a distance between the coherent light source 104 and top layer boundary 122 and/or the substrate boundary 124, the light beams reflected off the top layer boundary 122 and/or the substrate boundary 124, the interference between the light beams reflected off the boundaries 122 and 124, a distance between the top lay boundary 122 and/or the substrate boundary 124 and the detector array 106, or some combination thereof.

As illustrated in FIGS. 3A and 3B, the interference fringe patterns 310 and 320 may include one or more bright regions and/or one or more dark regions caused by the light beams reflected off the boundaries 122 and 124 being in phase or out of phase with one another. In example embodiments in which the interference fringe pattern 310 may be radial, for example, as illustrated in FIG. 3A, the one or more bright regions and/or the one or more dark regions may also be radial. Similarly, in example embodiments in which the interference fringe pattern 320 may be substantially linear, for example, as illustrated in FIG. 3B, the one or more bright regions and/or the one or more dark regions may be substantially linear and may be in the form of bands.

With the coherent light source 104 outputting the one or more light beams and with no acoustical wave impingent on the top layer 112, the detector array 106 may measure an initial interference fringe pattern incident thereupon. The detector array 106 may store the measure of the initial interference fringe pattern for use in subsequent determinations as described below. With no acoustical wave impingent on the top layer 112, there may be no vertical displacement of the top layer boundary 122 and thus the interference fringe pattern at the detector array 106 may be unchanged (i.e., constant).

With the coherent light source 104 outputting the one or more light beams and with an acoustical wave impingent on the top layer 112, the detector array 106 may measure a spatial displacement of the initial interference fringe pattern incident thereupon. The spatial displacement of the initial interference fringe pattern may include horizontal and/or vertical displacement. The spatial displacement may be a change in a relative position of the initial interference fringe pattern.

The acoustical wave impingent on the top layer 112 may cause a vertical displacement of the top layer 112 which may in turn cause changes in the light beams reflected off the top layer boundary 122. The changes in the light beams reflected off the top layer boundary 122 may cause a change in the path length between the top layer boundary 122 and the detector array 106. The changes in the light beams reflected off the top layer boundary 122 may further cause a change in the interference between the light beams reflected off the boundaries 122 and 124 which may in turn cause a spatial displacement of the initial interference fringe pattern inci-dent on the detector array 106. Properties of the acoustical wave impingent on the top layer 112 may be measured by the detector array 106 by measuring the spatial displacement of the initial interference fringe pattern. The spatially displaced initial interference fringe pattern may be referred to as a displaced interference fringe pattern.

Figure 4:
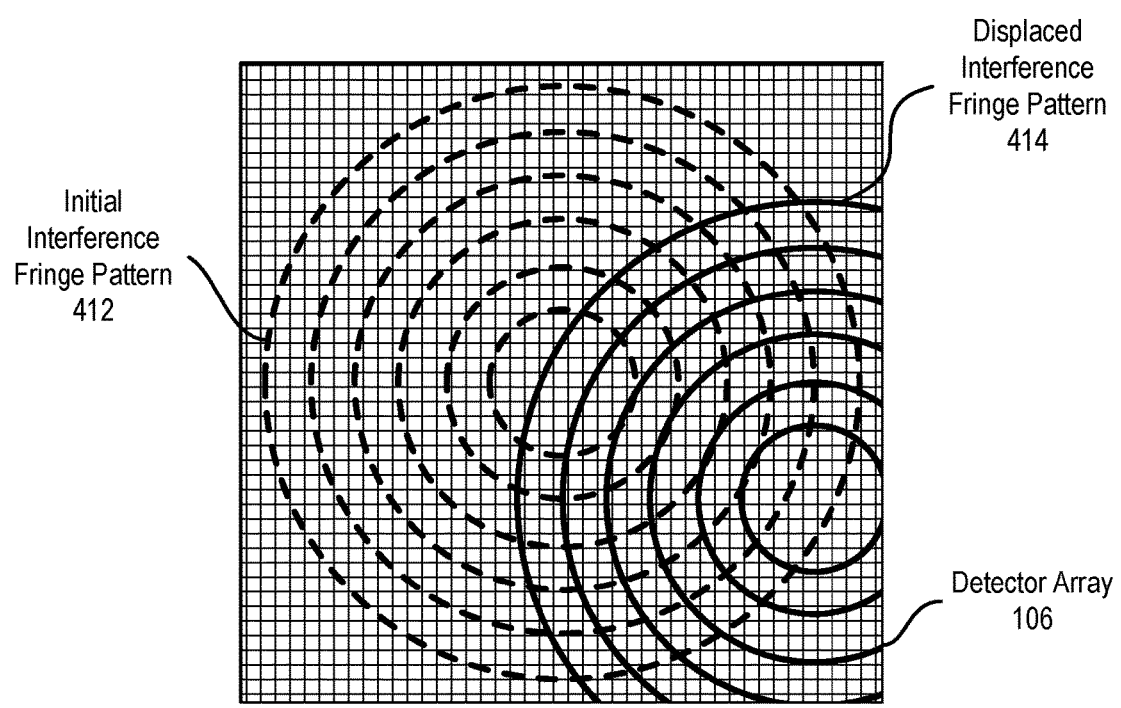
FIG. 4 illustrates a detector array having an initial interference fringe pattern and a displaced interference fringe pattern incident thereupon, according to one example embodiment.

Referring briefly to FIG. 4, it illustrates an initial interference fringe pattern 412 and a displaced interference fringe pattern 414 at the detector 106, according to one example embodiment. The displaced interference fringe pattern 414 may be used to determine amplitude, frequency, and phase information of the acoustical wave impingent on the top layer 112. For example, the detector array 106 may use an amount of spatial displacement of the initial interference fringe pattern 412 to determine the amplitude of the acoustical wave, may use a rate of change of the spatial displacement of the initial interference fringe pattern 412 (i.e., how quickly or slowly the initial interference fringe pattern 412 is displaced) to determine the frequency of the acoustical wave, and may use a direction of spatial displacement of the initial interference fringe pattern 412 (i.e., whether the initial interference fringe pattern 412 is coming or going) to determine a phase of the acoustical wave. In some configurations, the detector array 106 may further include a plate which may provide phase shift information of either 0°, 90°, 180°, and 270°. Any ambiguities in determining the amplitude, frequency, and/or phase information of the acoustical wave may affect a signal to noise ratio.

Acoustic Transducer

Figure 5:
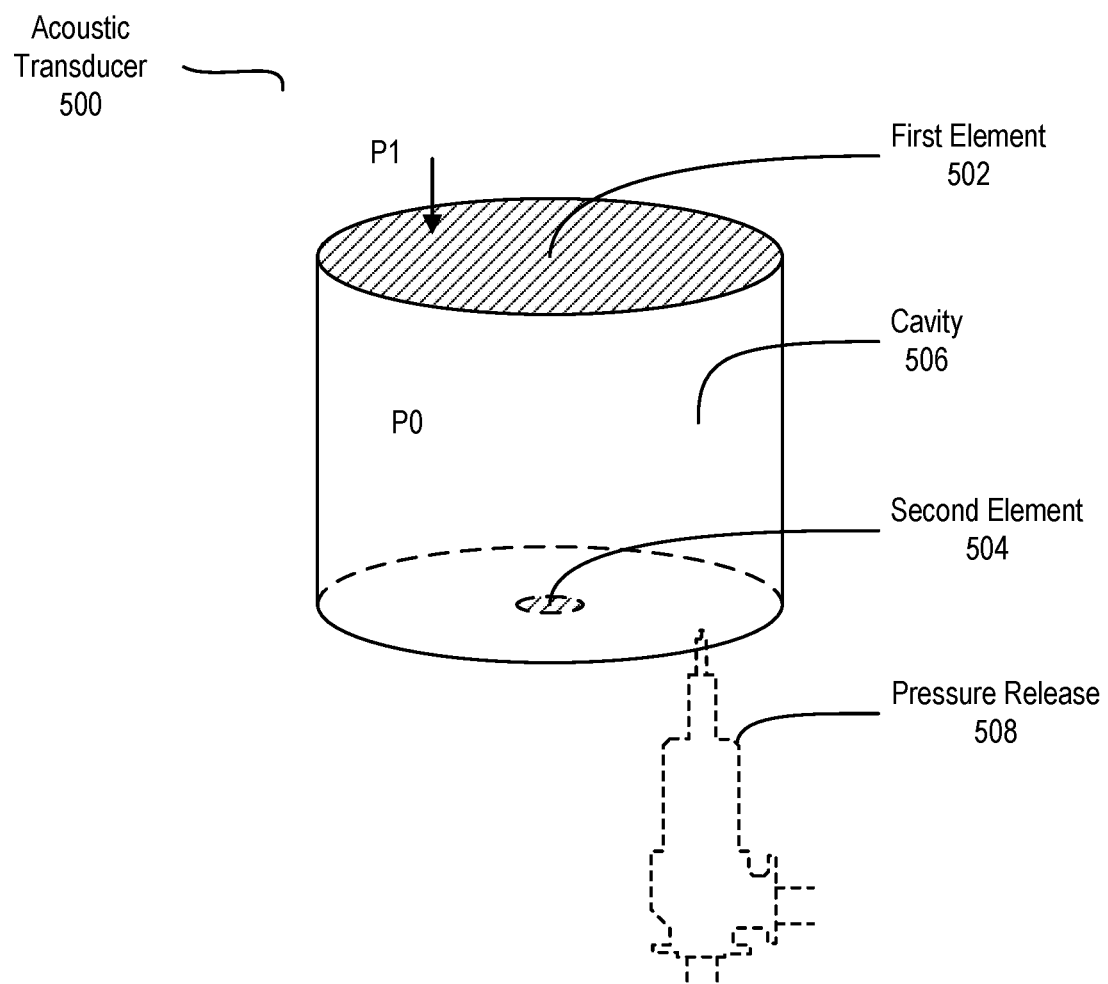
FIG. 5 illustrates an acoustic transducer, according to one example embodiment.

FIG. 5 illustrates an acoustic transducer 500 (referenced as transducer 500), according to one example embodiment. The transducer 500 may measure (or otherwise quantify) an acoustical wave impingent thereupon. For example, the transducer 500 may determine amplitude and frequency information of the acoustical wave. The transducer 500 may reconstruct the acoustical wave based on the determined amplitude and frequency information. The transducer 500 may be embedded or otherwise included in a ruggedized device and may be sealed against water or air leakage. The transducer 500 may include a first element 502, a second element 504, and a cavity 506 separating the first and second elements 502 and 504.

The first element 502 is an acoustic surface that is modulated due to an acoustical wave impingent thereupon. The second element 504 is an acoustic surface that is modulated due to the acoustical wave impingent on the first element 502. The cavity 506 may act as an amplifier and may have an associated amplification factor. The cavity 506 may amplify a vertical displacement of the first element 502. The amplification factor may be based on a difference in modulus of the compliant materials of the first and second elements 502 and 504 and areas A1 and A2 of the first and second elements 502 and 504, respectively. The cavity 506 may be filled with air.

The first element 502 may have an area A1 and the second element 504 may have an area A2. The area A1 may be much greater than the area A2. A material of the first element 502 may be less compliant than that of the second element 504. The area A1 and deformation characteristics of the first element 502 may be such that the first element 502 may be vertically displaced very little when there is a change in pressure exerted thereupon (e.g., where there is an acoustical wave impingent thereupon). On the other hand, the area A2 and deformation characteristics of the second element 504 may be such that the second element 504 may be vertically displaced much more than the first element 502 when there is a change in pressure exerted thereupon (i.e., when there is an acoustical wave impingent upon the first element 502).

The first element 502 may have a non-acoustical pressure P1 exerted onto it and the cavity 506 may have a non-acoustical pressure P0 inside of it. If the pressure P1 is the same as the pressure P0, the first and second elements 502 and 504 may not be vertically displaced (i.e., may be flat). As the pressure P1 increases, the first element 502 may be vertically displaced, which may in turn cause the pressure P0 to increase, which may in turn cause the second element 504 to be vertically displaced. The difference between the pressures P1 and P0 may be directly related to the amount of vertical displacement of the second element 504.

In one example embodiment, a lookup table may store a mapping of differences in pressures P1 and P0 and a vertical displacement of the second element 504. The lookup table may be used to calibrate out vertical displacement of the second element 504 due to non-acoustical differences in pressures P1 and P0.

In another example embodiment, the transducer 500 may include an optional pressure release 508. The pressure release 508 may be used to decrease the pressure P0 until the pressure P0 is such that there is no vertical displacement of the second element 504. Thus, the pressure release 508 may calibrate out vertical displacement of the second element 504 due to the non-acoustical difference in pressures P1 and P0.

An acoustical wave impingent on the first element 502 may cause a vertical displacement of the first element 502. The vertical displacement of the first element 502 due to the acoustical wave may be different than the vertical displacement of the first element 502 due to the non-acoustical pressure P1 exerted onto it. For example, the rate of vertical displacement due to the acoustical wave may be greater than the rate of vertical displacement due to the non-acoustical pressure. The vertical displacement of the first element 502 due to the acoustical wave may cause a change in the pressure P0 which may in turn cause a vertical displacement of the second element 504. The vertical displacement of the second element 504 may be used to determine amplitude and frequency information of the acoustical wave impingent on the first element 502. For example, the amount of spatial displacement of the second element 504 may be used to determine the amplitude of the acoustical wave and a rate of change of the vertical displacement of the second element 504 may be used to determine the frequency of the acoustical wave.

The vertical displacement of the first element 502 due to the acoustical wave may give acoustical gain and the vertical displacement of the second element 504 due to the acoustical wave may be measured. A gain may be a ratio of the vertical displacement of the first element 502 and the vertical displacement of the second element 504.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for acoustic transducers through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An opto-acoustic transducer comprising:
   a light source configured to generate light beams;
   a substrate configured to reflect the light beams generated by the light source;
   a top layer configured to modulate responsive to an acoustical wave impingent thereupon and to reflect the light beams generated by the light source;
   an interstitial layer between the substrate and the top layer, the interstitial layer comprising a first cavity and a second cavity configured to act as an optical collector, the first cavity and the second cavity separated by a spacer;
   a lens configured to propagate the light beams reflected by the substrate and the light beams reflected by the top layer; and a detector array configured to reconstruct the acoustical wave impingent on the top layer based on the light beams propagated by the lens.

2. The opto-acoustic transducer of claim 1, further comprising an input diffraction grating between the light source and a bottom of the substrate, the input diffraction grating comprising an optical structure and an analyzer configured to measure modulation of light reflected thereupon.

3. The opto-acoustic transducer of claim 1, further comprising an output diffraction grating between a bottom of the substrate and the detector array, the output diffraction grating comprising an optical structure and an analyzer configured to measure modulation of light reflected thereupon.

4. The opto-acoustic transducer of claim 1, wherein the first cavity is at a top of the interstitial layer and the second cavity at a bottom of the interstitial layer, and wherein the first cavity has a first area and the second cavity has a second area, wherein the first area is greater than the second area.

5. The opto-acoustic transducer of claim 1,
wherein the substrate includes a substrate boundary between a top of the substrate and a bottom of the interstitial layer;
wherein the top layer includes a top layer boundary between a bottom of the top layer and a top of the interstitial layer; and
wherein the detector array is further configured to measure an interference fringe pattern incident thereupon, the interference fringe pattern caused by interference between light beams reflected off the top layer boundary and light beams reflected off the substrate boundary.

6. The opto-acoustic transducer of claim 5, wherein the detector array is at least a Talbot length from the top layer boundary.

7. The opto-acoustic transducer of claim 5, wherein the interference fringe pattern is a Moire pattern.

8. The opto-acoustic transducer of claim 5, wherein the detector array comprises a plurality of detectors, each detector configured to measure a part of the interference fringe pattern incident thereupon.

9. The opto-acoustic transducer of claim 8, wherein each detector of the plurality of detectors is further configured to output a voltage representing the part of the interference fringe pattern incident thereupon, and wherein the detector array is further configured to sum the voltage output by each detector, the sum representing the interference fringe pattern incident upon the detector array.

10. The opto-acoustic transducer of claim 5, wherein the detector array is further configured to measure a spatial displacement of the interference fringe pattern.

11. The opto-acoustic transducer of claim 10, wherein the spatial displacement includes one or more of horizontal displacement and vertical displacement.

12. The opto-acoustic transducer of claim 10, wherein the detector array is further configured to determine an amplitude of the acoustical wave impingent on the top layer based on an amount of the spatial displacement of the interference fringe pattern.

13. The opto-acoustic transducer of claim 10, wherein the detector array is further configured to determine a frequency of the acoustical wave impingent on the top layer based on a rate of change of the spatial displacement of the interference fringe pattern.

14. The opto-acoustic transducer of claim 10, wherein the detector array is further configured to determine a phase of the acoustical wave impingent on the top layer based on a direction of the spatial displacement of the interference fringe pattern.

* * * * *